Feb. 4, 1964 S. CIRAMI 3,120,197
TRACKWAY AND YOKE ARRANGEMENT
Original Filed Oct. 21, 1958 8 Sheets-Sheet 1

INVENTOR.
Salvatore Cirami

Feb. 4, 1964  S. CIRAMI  3,120,197
TRACKWAY AND YOKE ARRANGEMENT
Original Filed Oct. 21, 1958  8 Sheets-Sheet 3

INVENTOR.
Salvatore Cirami

Feb. 4, 1964    S. CIRAMI    3,120,197
TRACKWAY AND YOKE ARRANGEMENT
Original Filed Oct. 21, 1958    8 Sheets-Sheet 4

INVENTOR.
Salvatore Cirami

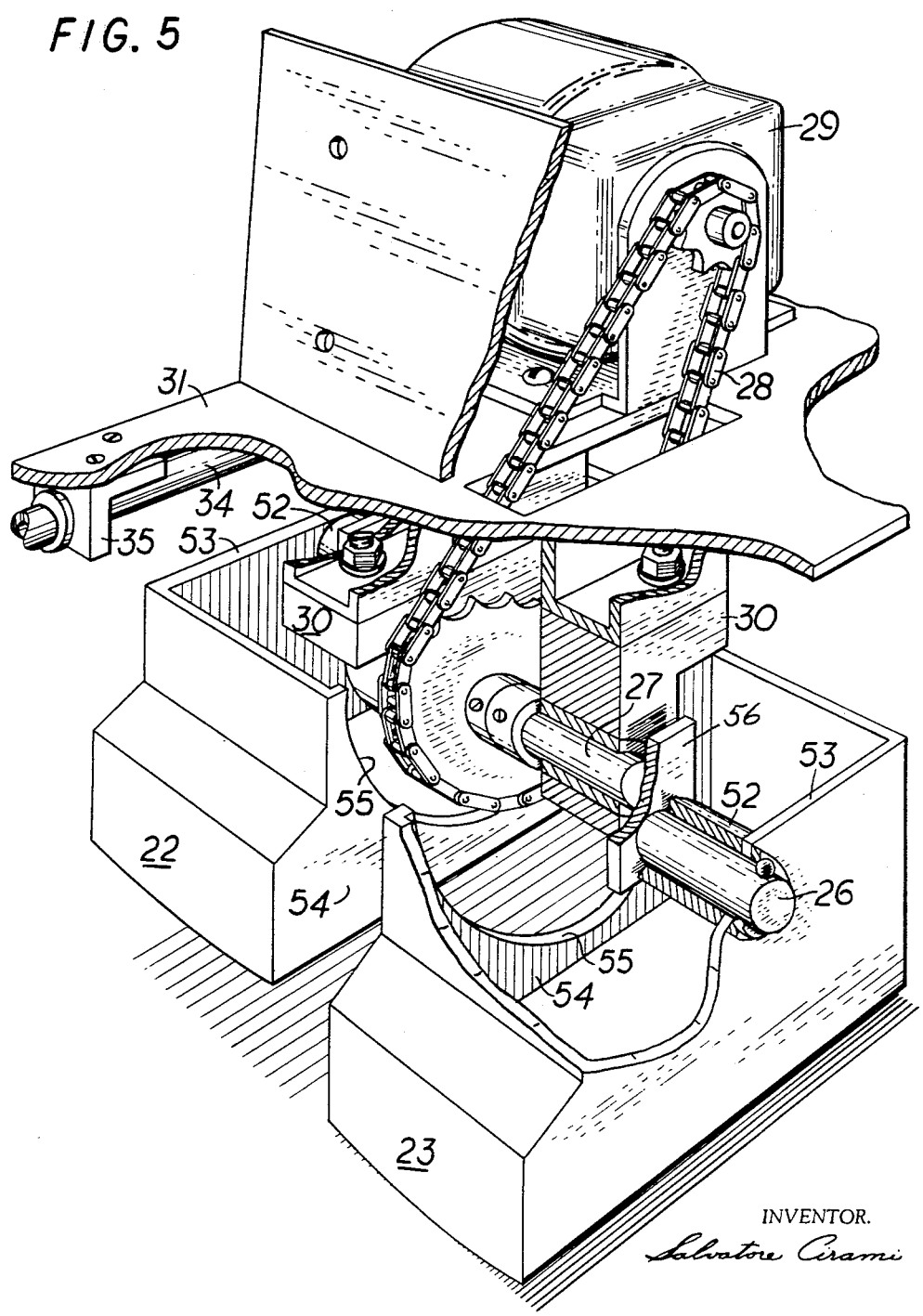

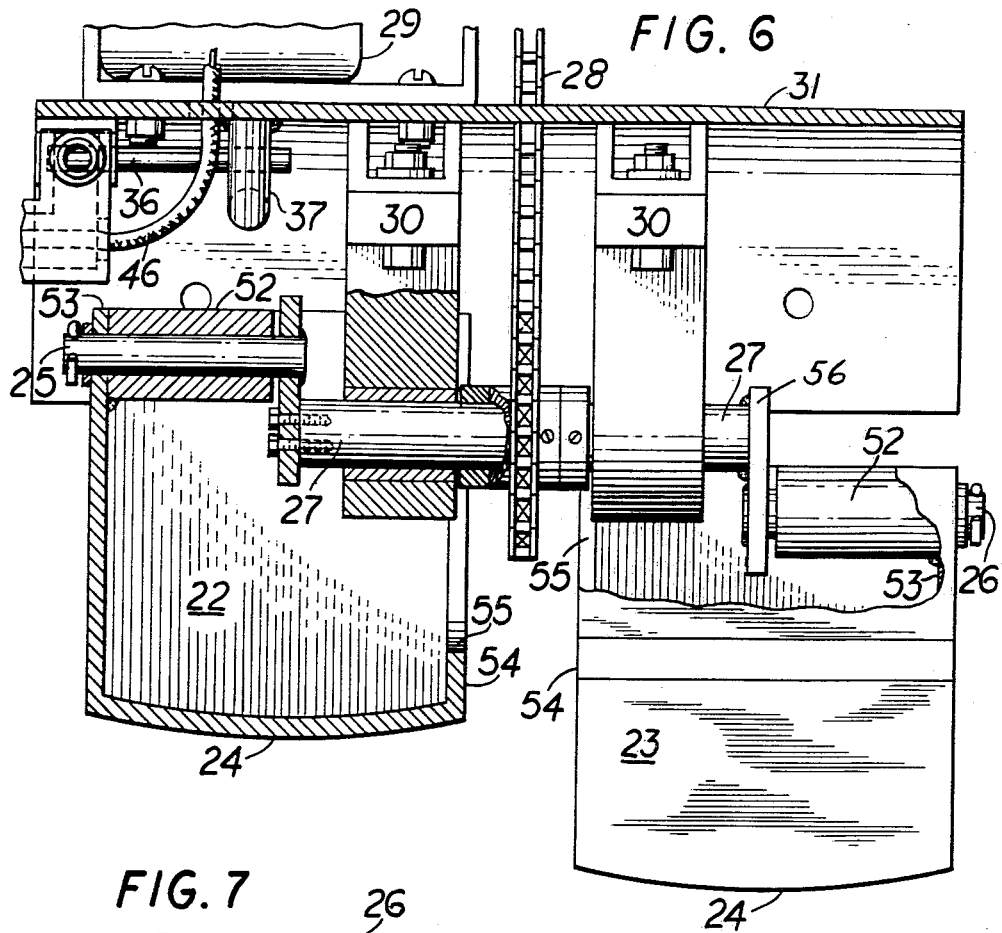
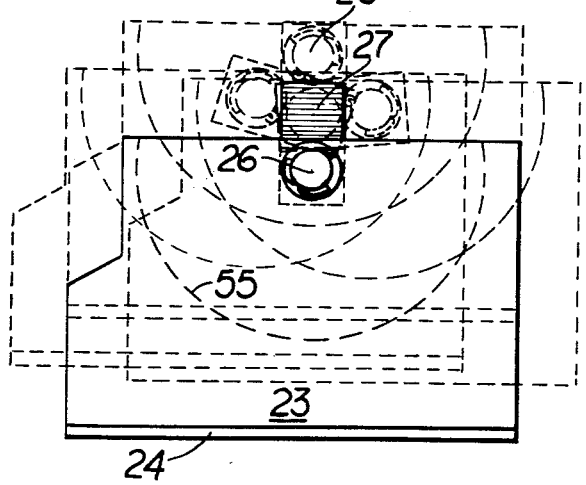

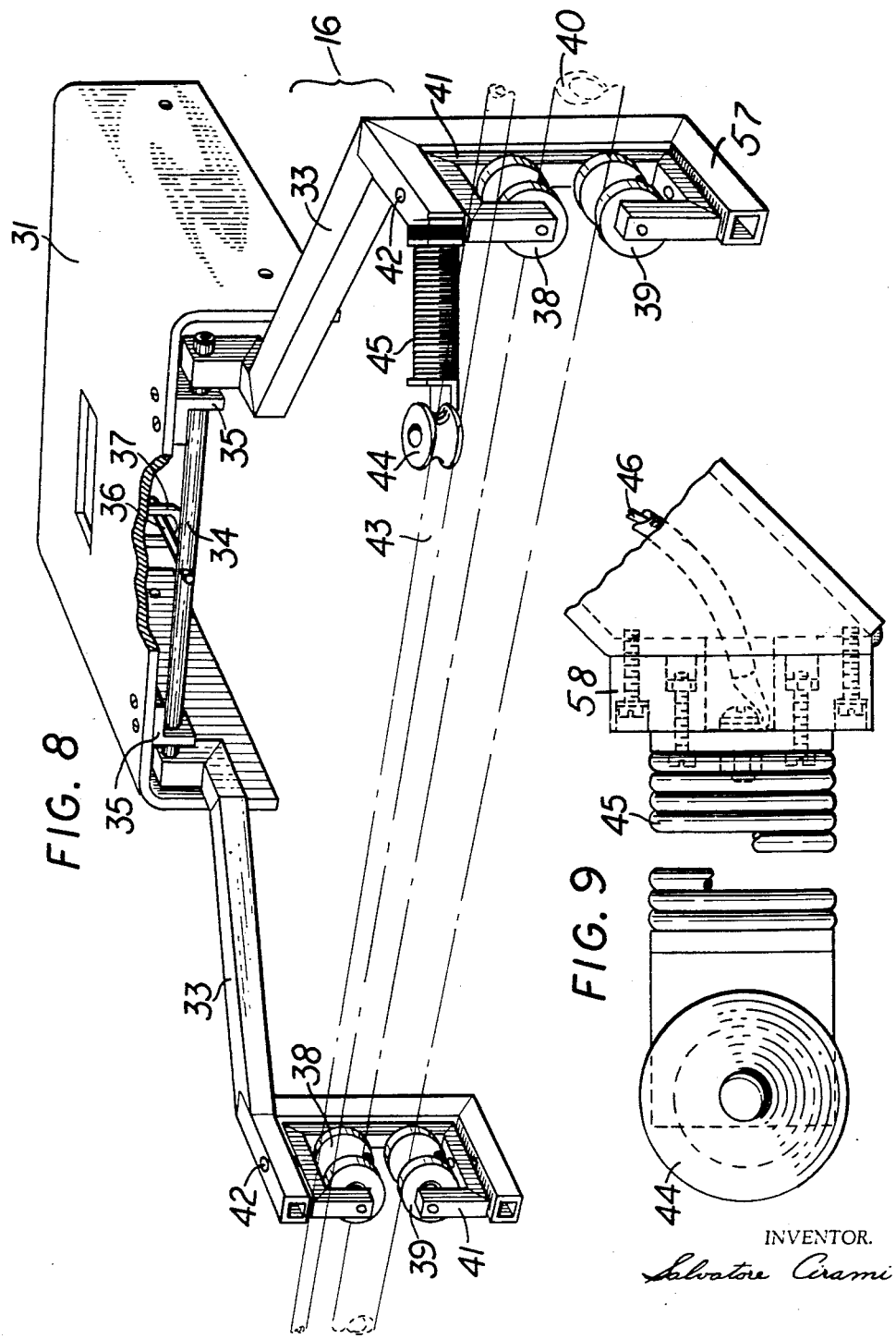

Feb. 4, 1964 S. CIRAMI 3,120,197
TRACKWAY AND YOKE ARRANGEMENT
Original Filed Oct. 21, 1958 8 Sheets-Sheet 8
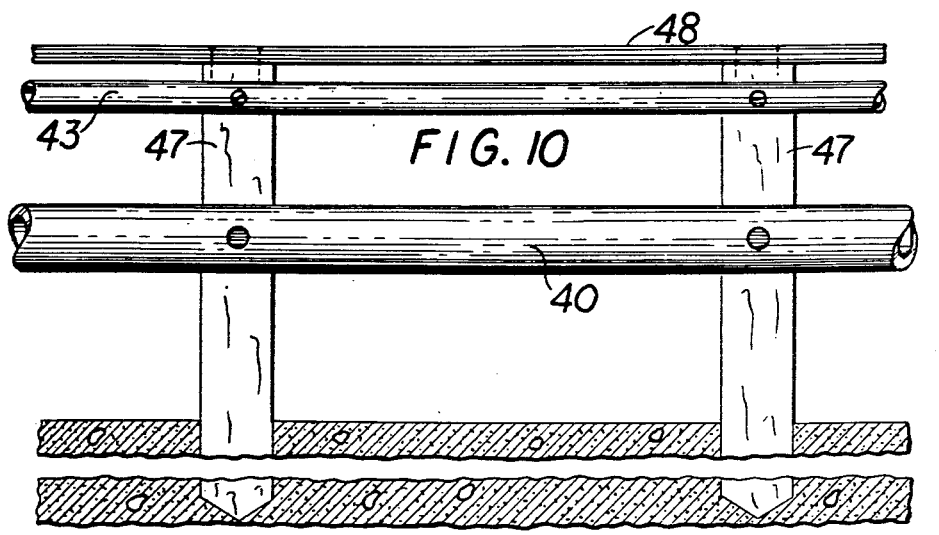
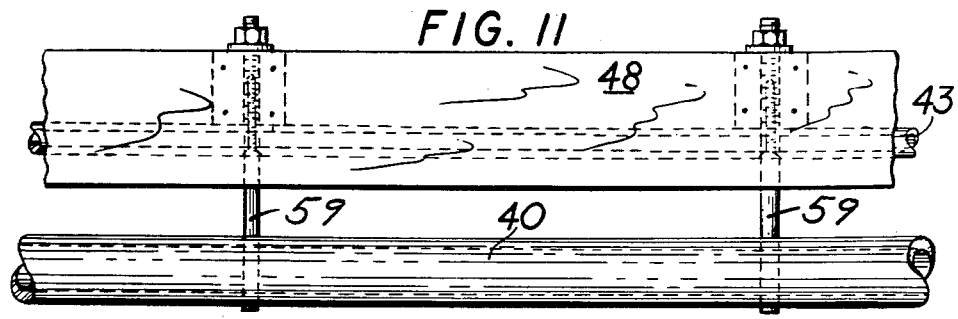
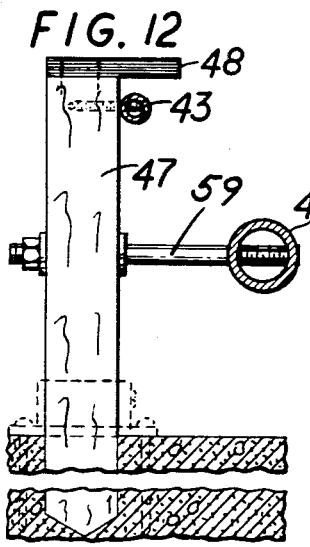
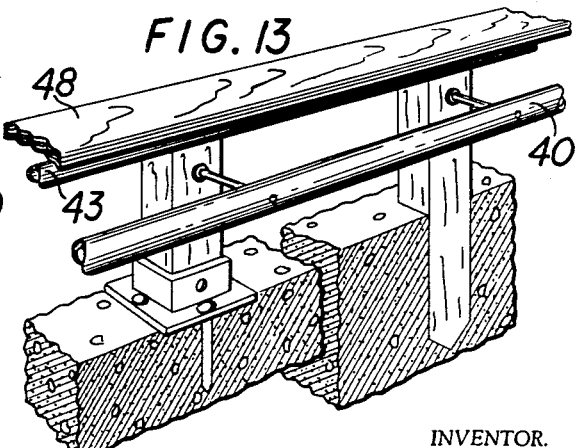
INVENTOR.
Salvatore Cirami

United States Patent Office 3,120,197
Patented Feb. 4, 1964

3,120,197
TRACKWAY AND YOKE ARRANGEMENT
Salvatore Cirami, 75—36 Parsons Blvd.,
Flushing, N.Y.
Original application Oct. 21, 1958, Ser. No. 768,793. Divided and this application Dec. 11, 1959, Ser. No. 859,072
2 Claims. (Cl. 104—245)

This invention provides a means to confine a self-propelled vehicle to travel along a zig-zagging course with freedom to adapt to rises and falls in the course without becoming disengaged from said means. It is a division of application Serial Number 768,793, filed October 21, 1958, for Robot Amusement Ride, and claims only the trackway and yoke arrangement shown there.

The idea is to provide a trackway situated alongside and following a course on which a self-propelled vehicle is poised for operation, and requiring the vehicle to follow the trackway by mechanically linking it to the trackway; so that by connection with the trackway the vehicle is confined to the course.

Accordingly, the main object is to provide an elevated guide rail arranged in a loop and situated alongside and following a path or course over which it is desired a vehicle should travel; and in combination with same, a yoke comprising a forward arm and an aft arm in fixed, spaced apart relationship with each other. The two are combined in such manner that the yoke (which is shaped more or less like a U or V) has its free ends (the forward and aft arms) linked to the guide rail, and its other side connected to the vehicle.

A second object is to provide means attached on the end of each yoke arm to link the yoke to the trackway in such manner that the arms will be able to follow the trackway through turns of varying degree or radius.

By this fore and aft adaptable connection with the track, the vehicle cannot "turn in" toward the trackway, i.e., it must at all times run parallel to the trackway and maintain a fixed distance from it. But, because the arms are long and spread apart, the guide rail of the trackway can bow in without touching the vehicle when it is on an outside turn.

A third object is to provide a yielding relationship between the yoke and the trackway to allow some vertical movement of the vehicle so that it can adapt to rises and falls in the course: both to insure the vehicle's traction members contact with the ground or course and also to allow the vehicle to climb over hills and valleys.

FIG. 5 is a broken part sectional perspective view of the walking mechanism.

FIG. 6 is a front broken sectional view of the same.

FIG. 7 is a side elevation and diagrammatic view illustrating different positions of one foot member.

FIG. 8 is a broken part perspective view showing the yoke structure employed to connect a robot to the trackway.

FIG. 9 is a broken part detail of the spring mounted contact roller assembly that engages an electric current carrying rail of the trackway, and is shown partly in phantom view.

FIGS. 10, 11, 12 and 13 are detail views of the trackway: FIG. 10 being a broken part sectional front elevation, FIG. 11 a broken part sectional top plan, FIG. 12 a cross sectional view and FIG. 13 a broken part sectional perspective view.

Figure 1:
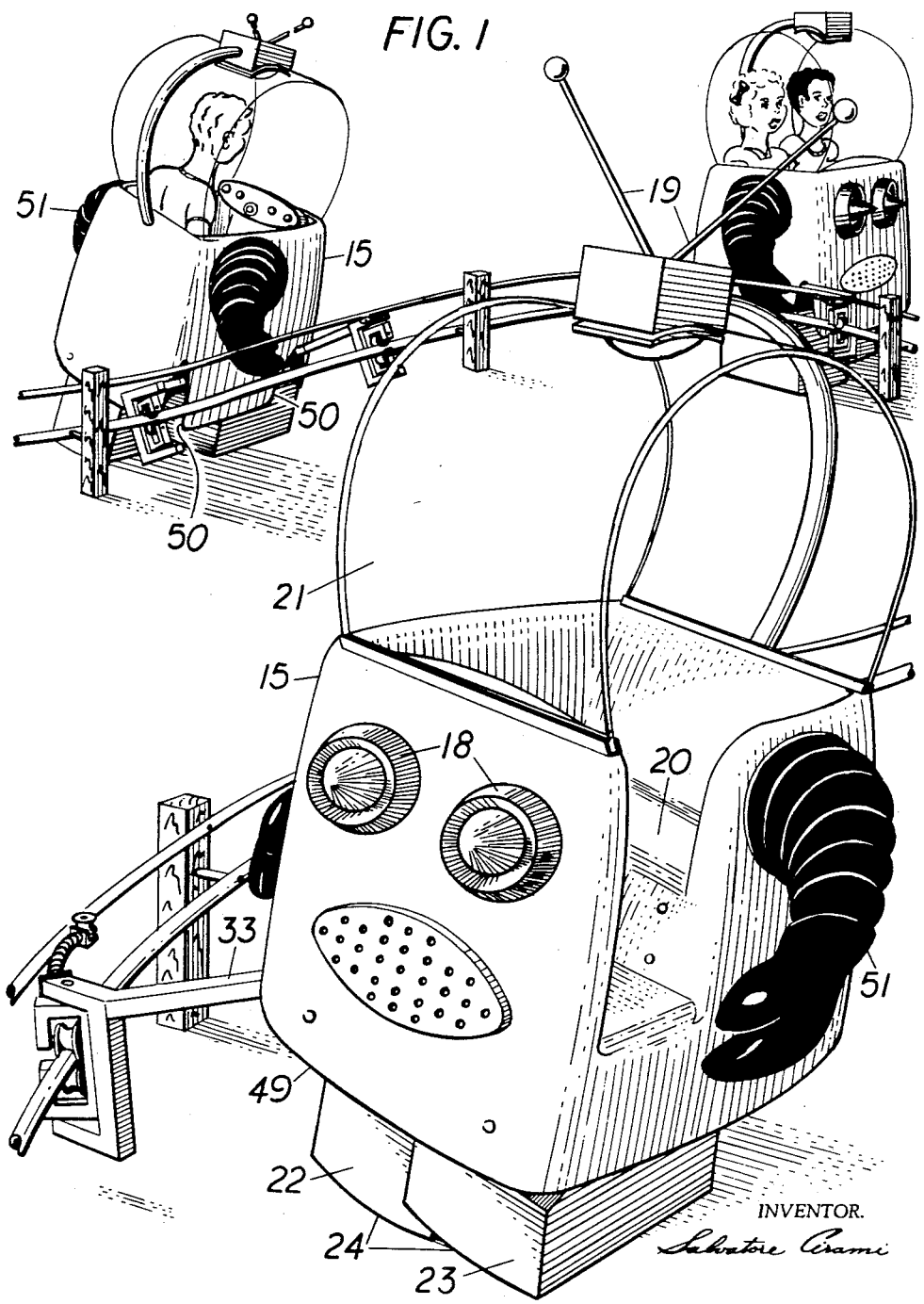
FIG. 1 is a perspective view illustrating in a general way the travel of the robots alongside a portion of a trackway guiding and supplying electricity to them.
Figure 2:
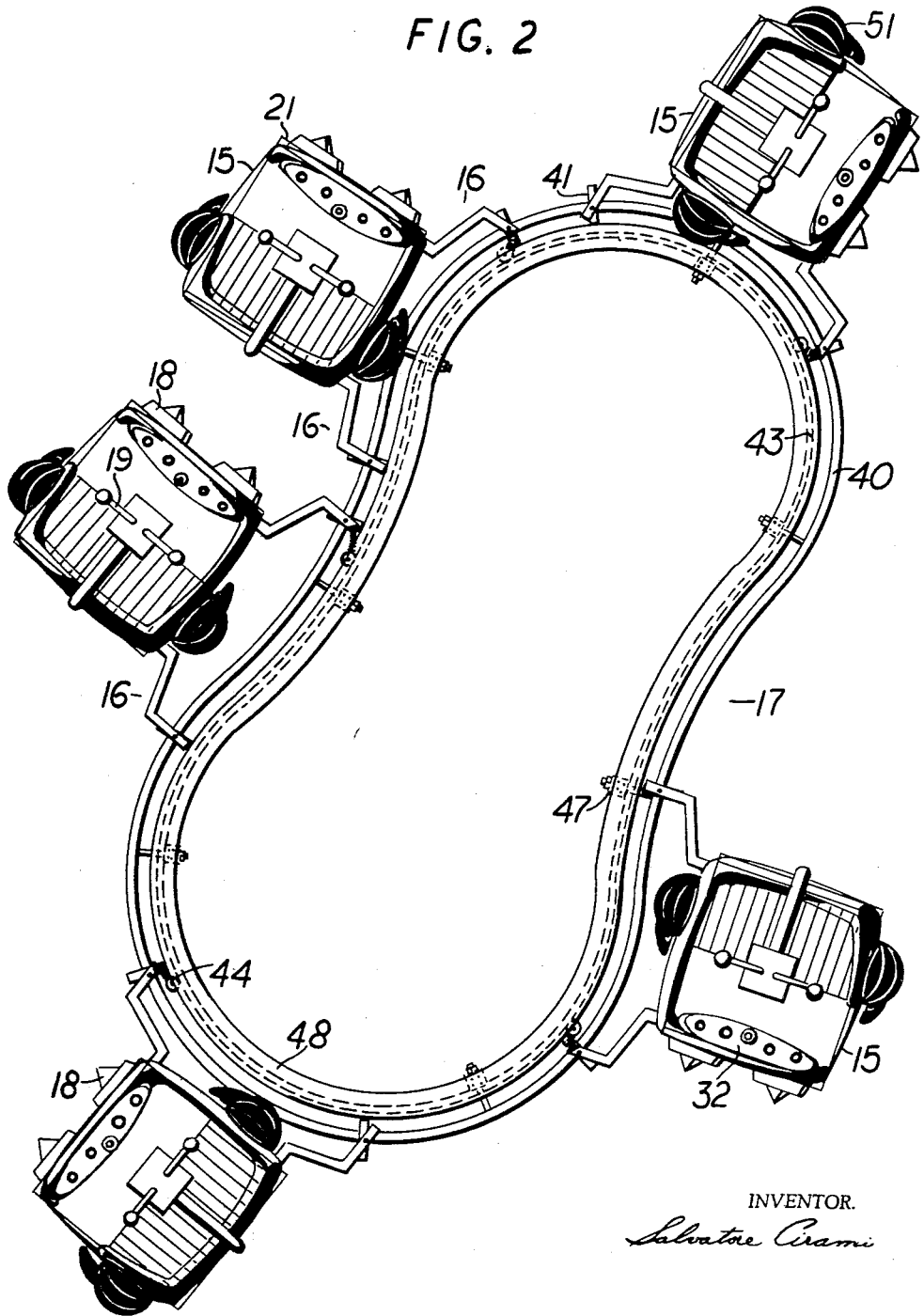
FIG. 2 is a top plan view of five robots following a simple trackway layout.

Referring to FIGS. 1 and 2 it will be seen that the invention comprises stepping robots of passenger carrying size containing self-propulsion mechanism and linked by yokes 16 to a guiding and power supplying trackway 17 in the form of a closed loop to thereby automatically return outgoing robots to the starting point.

Figure 3:
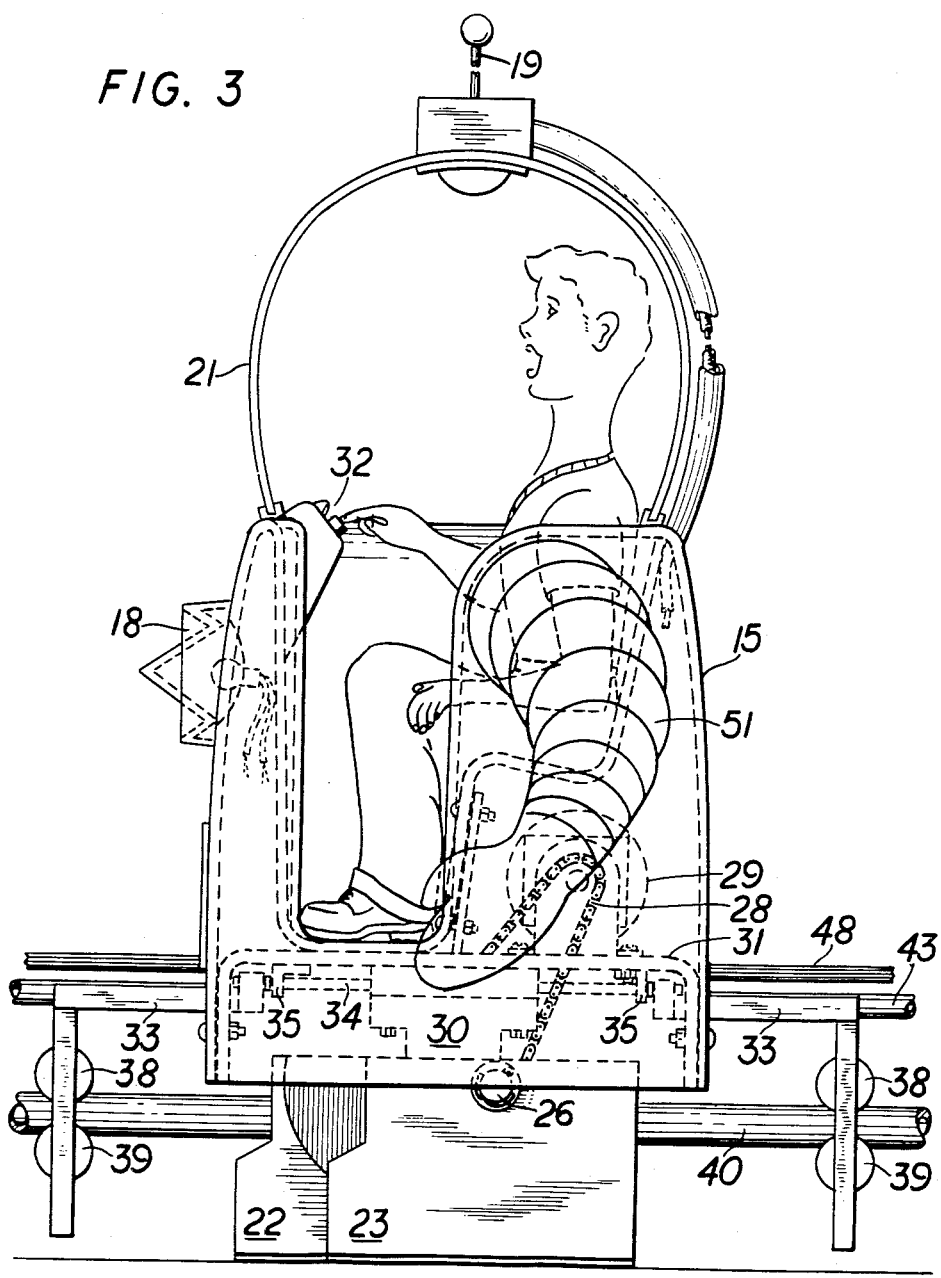
FIG. 3 is a side elevation of one robot and related trackway, with parts broken and appearing in section.

Arms 51, a head (the transparent enclosure 21), antennae 19, eyes (the lamps 18), and a mouth (the decoration under the eyes) coact to make the open top passenger compartment 15 look like the torso of a robot, FIGS. 2 and 3.

In FIGS. 5 and 6 a rotatable crankshaft (comprising a main shaft 27 with a perpendicular offset 56 at each end in opposed throw, and minor shafts 25, 26 supported by the offsets and parallel with the main shaft) is journaled in spaced apart bearings 30 fixed to and depending from the underside of the floor 31.

A geared down electric motor 29, FIG. 5, is mounted on top of the floor 31 (equivalent to the space under the seat) and is provided with power transmission means 28 extending through a slot in the floor to connect the motor to the portion of the main shaft exposed between the bearings 30.

Foot members 22, 23 in the form of low, hollow, open-top boxes with a large cutout 55 in their inboard wall 54 are provided with a bearing 52 fixed to the outboard wall 53. The cutouts and open tops permit the bearings 30 and crankshaft assembly to set down into the boxes. By containing the actuating elements within them, the foot members make a major contribution to low vehicular height. This hollow box feature, by concealing the drive means, enhances the machine's usefulness in amusement ride applications by creating wonderment as to the vehicle's motivation. It also protects operating parts from ground dust raised by the foot members pounding on terrain dried by summer heat.

The bearings 52 are designed to retain the minor shafts, being positioned so that each box will hang in balanced dependence from its respective minor shaft. This relationship is shown in FIG. 7 where one foot member or box is shown in some of the positions through which it will pass in each revolution of the crankshaft. The bearing 52 is positioned high enough above the base of the box so that the offset will clear the base when the foot is in the uplifted position. Because the foot member is free to pivot around the minor shaft, the underside of the base 24 remains level as the crankshaft rotates.

In operation rotation of the crankshaft by the motor causes the foot members 22, 23 to be alternately lifted, advanced, lowered and return in a plane perpendicular to the axis of the main shaft 27. In this way, each foot member in turn supports and advances the vehicle a distance equal to twice the throw of the actuating minor shaft 26.

Motor or other controls may be provided on the robot's "control panel" 32, FIG. 3.

The passenger compartment 15 is provided with a seat 20, FIG. 1, positioned rearward in said compartment and so constructed and arranged as to provide a space under the seat suitable to house a motor 29, FIG. 3.

The numeral 31, FIG. 3, indicates a structure serving to support the compartment 15 above, and a stepper below. Because the floor of the compartment rests directly upon the support 31, it is convenient to refer to 31 as the floor of the passenger compartment.

The walls of the compartment depend below the level of the floor 31 far enough to conceal from general view the means employed to move the foot members 22, 23, FIG. 3, which are arranged fixed to and depending from the underside of the support or floor 31.

The yokes 16, FIG. 2, are secured to one side of the compartment 15, and the actual point of connection, in this embodiment, is at the underside of the support or floor 31. This relationship is best seen in FIG. 8, where the floor or support structure 31 is shown enlarged.

Since the walls of the passenger compartment depend—as indicated by 49, FIGS. 1, 4—below the level of the floor, and the yoke arms 33 project laterally from the underside of the floor; it is necessary to provide openings at 50, FIG. 1, to pass the yoke arms.

Figure 4:
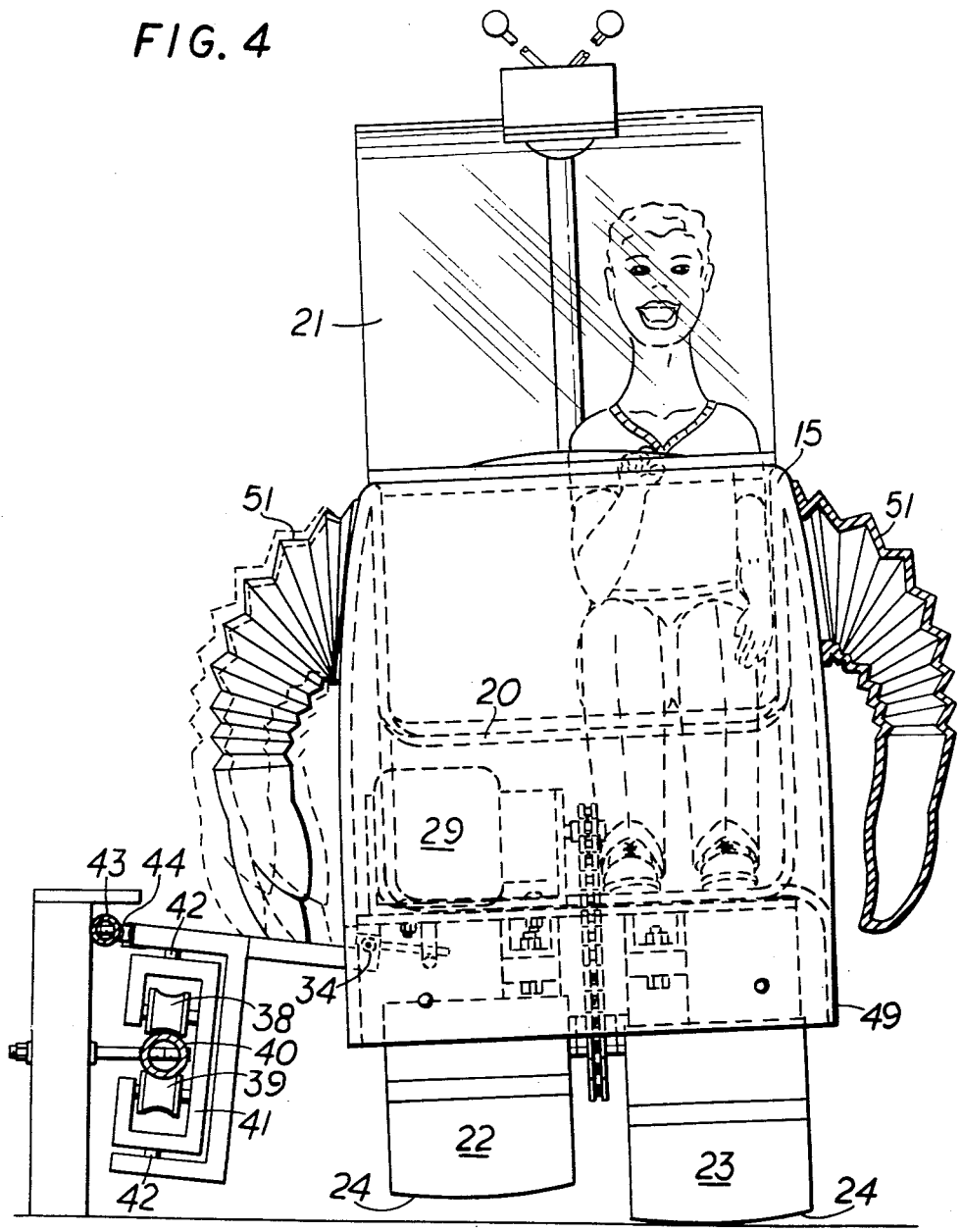
FIG. 4 is a front view of the same unit with parts shown in section.

The yokes 16, FIG. 2, link the robots to a guide rail 40, which it can be seen in FIGS. 3, 4 is carried at an elevation above the ground or level plane upon which the robot stands.

Each yoke comprises a pair of arms 33, FIG. 8, rigidly held—by a closed side 34—in fixed spaced apart relation in a horizontal plane. The arms 33 are provided rigidly fixed to the closed side 34.

It is desirable that the yoke be pivotally connected to the rider support or floor 31 in such arrangement that the rider support, or the compartment attached on the floor 31 will be permitted a limited degree of freedom to lean toward and away from the guide rail 40. To accomplish this, the closed side 34 of the yoke is provided in the form of a shaft and is arranged journaled in bearings 35 fixed to and depending from the underside of the floor 31. The degree to which the compartment can lean is limited by the rod 36 which is fixed to the closed side or shaft 34 and arranged projecting into a confining loop 37. The end of each yoke arm 33 that is furthest from the end that is fixed to the closed side 34 is termed in the claims a "free end." In FIG. 8, it can be seen that the free end of each yoke arm is provided with means to link the arm to the guide rail, and since a separate such means is provided for each arm, it is clear that the arms are independently linked to the guide rail. This means that the arms will be able to follow horizontal undulations or turns in the guide rail, independently of each other; the significance being that because of this feature the yoke will be able to follow turns of small radius although the arms are spread far enough apart to cause the support 31 to follow turns in the rail efficiently (without turning in towards the rail itself and jamming against it).

Each means to independently link the free end of a yoke arm 33 to the guide rail 40 comprises a pair of rollers 38, 39 disposed to roll around separate horizontal axes, said axes lying parallel to each other and spaced apart in the same vertical plane. The rollers are provided with a concave periphery to correspond with the guide rail which is provided with a circular cross-section, as shown best in FIG. 12. The rollers are arranged one above and one below the guide rail so as to confine the guide rail between them. Means to hold the rollers in the described relationship relative to each other and relative to the guide rail are provided in the form of a C-shaped rack 41 pivotally connected to the free end of the yoke arm in such arrangement that the rack—and therefore the rollers—swivel around a vertical axis. In the embodiment illustrated, this is achieved by mounting the rack in a C-shaped frame 57 in such arrangement that the rack 41 swivels around the pin 42 passing through the upper horizontal arms of both C-shaped structures. A similar pin is provided to connect the lower horizontal arms of the C-shaped structures. The pin 42 is positioned such that the rollers swivel around a vertical axis that perpendicularly intersects the horizontal axis of each roller and passes through the center of a circular cross-section of the guide rail taken in the vertical plane in which said horizontal axes are disposed.

The trackway includes a power rail 43, FIG. 8, to carry electric current for the robot's motor and the decorative lamps 18. A pickup for the current is provided in the form of a roller 44 yieldingly carried by a spring 45 and connected by wiring 46 (see FIG. 9, where the pickup is shown enlarged) passed through the inside of the yoke arm—which is provided hollow—and connected to the motor installed on the floor 31, and connected to the lamps installed on the compartment which is arranged attached on the floor or support 31. The insulating block 58 electrically isolates the roller 44 and spring 45 from the yoke arm; and the screws that connect the block 58 to the spring and yoke structure are shown in phantom view to reveal the method of attachment and also to show how the wiring 46 is connected to the spring 45, FIG. 9.

Turning to FIGS. 10–13, the trackway comprises a guide rail 40 carried at an elevation by spaced apart posts 47, and held apart from the posts by a laterally projecting support 59 extending from each post and fixed to the guide rail. The power rail 43 is arranged above the guide rail and is covered by an overhanging shield 48. FIG. 13 suggests alternate methods of securing the posts to the ground, the choice depending on whether the installation is permanent on concrete at the left, or temporary in earth at the right.

In practice, a number of robots are operated on the same trackway, one following the other; the number of vehicles and therefore the capacity of the ride limited only by the length of trackway in use.

Although in the drawings a particular kind of self-propelled vehicle is shown, obviously the trackway and yoke will cooperate with any kind of self-propelled conveyance.

For example, the walking robots shown move slowly along the course, so that the trackway and yoke functions only to permit the robots to adapt to irregularities in the terrain, as well as, of course, to allow them a certain amount of freedom to rock from side to side and make sharp turns in the course.

But if other types of vehicles were used, such as a rapidly moving wheeled type; the irregularities mentioned would cause it to bounce up and down as it progressed along the course. This feature could be maximized by putting obstacles in the way, such as steep hills and valleys or inclined planes with a sudden drop at the end. So long as the bouncing did not exceed the few degrees of freedom of vertical movement allowed by this particular arrangement of trackway and yoke, the latter would make a safe and exciting amusement ride entirely different in action from the one contemplated in the drawings.

The term "course" could include a channel of water; and the "self-propelled vehicle" a speed boat of the hydroplane outboard motor equipped racing type. Ramps in the water would correspond to the "irregularities," and still another interesting ride could be developed—all with the same trackway and yoke. These illustrations serve to show the range of elements I consider to be the equivalent of these terms as I use them in the claims.

I claim:

1. A trackway and yoke arrangement for guiding a self-propelled vehicle along a course, comprising:
   a guide rail provided with means to support the rail at an elevation alongside a course paralleling said guide rail;
   a yoke comprising a pair of arms having free ends rigidly held—by a closed side—in fixed spaced apart relation in a horizontal plane;
   means to independently link the free end of each yoke arm to said guide rail in riding engagement with same, said means so constructed and arranged that each yoke arm is required to follow horizontal turns in the guide rail, and the said closed side of the yoke projects away from the guide rail and towards said course;
   means to provide a yielding relationship between the free end of each yoke arm and said guide rail such that the closed side of the yoke has a degree of freedom to move around the longitudinal axis of the guide rail, sufficient to assure a self-propelled vehicle traction on said course when the vehicle is arranged secured to the closed side of the yoke.

2. A trackway and yoke arrangement for guiding a self-propelled vehicle along a course, comprising:

a guide rail provided with means to support the rail at an elevation alongside a course paralleling said guide rail; said guide rail provided circular in cross-section, said means to support the rail comprising spaced apart posts each provided with a laterally projecting support extending from the post and fixed to the guide rail;

a yoke comprising a pair of arms having free ends rigidly held—by a closed side—in fixed spaced apart relation in a horizontal plane;

each yoke arm provided with a pair of rollers disposed to roll around separate horizontal axes, said axes lying parallel to each other and spaced apart in the same vertical plane; said rollers provided with a concave periphery corresponding with the circular cross-section of said guide rail, and arranged one above and one below the guide rail so as to confine the guide rail between them; means to hold said rollers in the described relationship relative to each other and relative to the guide rail, said means provided pivotally connected to the free end of the yoke arm in such arrangement that the rollers swivel around a vertical axis that perpendicularly intersects the horizontal axis of each roller and passes through the center of a circular cross-section of the guide rail taken in the vertical plane in which said horizontal axes are disposed;

as seen in the vertical plane in which said circular cross-section is taken, each laterally projecting support proportioned sufficiently narrower than said cross-section as to allow said rollers a degree of freedom to move around the circumference of said cross-section, sufficient to assure a self-propelled vehicle traction on said course when the vehicle is arranged secured to the closed side of the yoke.

References Cited in the file of this patent

UNITED STATES PATENTS

| | | |
|---|---|---|
| 262,971 | Moore | Aug. 22, 1882 |
| 316,969 | High | May 5, 1885 |
| 921,508 | Burgess | May 11, 1909 |
| 1,159,519 | Menier | Nov. 9, 1915 |
| 1,532,836 | Schmid et al. | Apr. 7, 1925 |
| 1,788,572 | Goodman | Jan. 13, 1931 |
| 1,795,591 | Allen | Mar. 10, 1931 |
| 1,825,968 | Mapson | Oct. 6, 1931 |
| 1,916,999 | Traver | July 4, 1933 |
| 2,045,007 | Carpenter | June 23, 1936 |
| 2,500,805 | Costello | Mar. 14, 1950 |